(12) United States Patent
Walthert et al.

(10) Patent No.: US 12,344,031 B2
(45) Date of Patent: Jul. 1, 2025

(54) WHEEL COMPONENT FOR A WHEEL OF A TWO-WHEELED VEHICLE OPERATED AT LEAST IN PART BY MUSCULAR ENERGY, AND A WHEEL, AND A METHOD

(71) Applicant: DT SWISS INC., Grand Junction, CO (US)

(72) Inventors: Martin Walthert, Aarberg (CH); Stefan Spahr, Lengnau (CH); Mathias Bärtschi, Studen BE (CH)

(73) Assignee: DT SWISS INC., Grand Junction, CO (US)

( * ) Notice: Subject to any disclaimer, the term of this patent is extended or adjusted under 35 U.S.C. 154(b) by 380 days.

(21) Appl. No.: 17/815,084

(22) Filed: Jul. 26, 2022

(65) Prior Publication Data

US 2023/0103812 A1    Apr. 6, 2023

(30) Foreign Application Priority Data

Oct. 1, 2021    (DE) .......................... 102021125543.0

(51) Int. Cl.
*B60B 1/04* (2006.01)
*B60B 21/06* (2006.01)

(52) U.S. Cl.
CPC .............. *B60B 1/047* (2013.01); *B60B 1/041* (2013.01); *B60B 1/045* (2013.01); *B60B 21/062* (2013.01)

(58) Field of Classification Search
CPC ......... B60B 1/041; B60B 1/044; B60B 1/045; B60B 1/047; B60B 21/062
See application file for complete search history.

(56) References Cited

U.S. PATENT DOCUMENTS 7,658,452 B2    2/2010    Spahr et al.
9,421,817 B2    8/2016    Walthert et al.
(Continued)

FOREIGN PATENT DOCUMENTS

DE    1427377 C3    4/1974
DE    155311 A1    6/1982
(Continued)

OTHER PUBLICATIONS

German Search Report received for Application No. 10 2021 125 543.0, dated Apr. 5, 2022.
(Continued)

*Primary Examiner* — S. Joseph Morano
*Assistant Examiner* — Emily G. Castonguay
(74) *Attorney, Agent, or Firm* — Greer, Burns & Crain, Ltd (57) ABSTRACT

A wheel component for a wheel of an at least partially muscle-powered two-wheeled vehicle, including a rim provided to be connected with a hub by means of spokes, the rim including a rim base with a plurality of spoke socket sections having one spoke hole each, to which the spokes can be attached by means of spoke nipples. The wheel component includes at least one washer for placement between a spoke socket section and a spoke nipple. The washer includes a through hole extending between a top face and a bottom face. The rim base includes two opposite rim flanks extending obliquely relative to one another. In its bottom face, the washer shows a canted support flank at least in sections. The washer can be supported on the rim flanks by means of its support flank such that only the support flank bears against, and contacts, the rim.

31 Claims, 3 Drawing Sheets

(56) References Cited

U.S. PATENT DOCUMENTS

| | | | |
|---|---|---|---|
| 2007/0063575 A1* | 3/2007 | Passarotto | B60B 21/025 |
| | | | 301/58 |
| 2013/0300186 A1* | 11/2013 | Schlanger | B60B 1/043 |
| | | | 301/58 |
| 2014/0239703 A1* | 8/2014 | Walthert | B60B 1/041 |
| | | | 301/58 |
| 2021/0039429 A1 | 2/2021 | Schlanger | |
| 2021/0162801 A1 | 6/2021 | Meggiolan | |

FOREIGN PATENT DOCUMENTS

| | | |
|---|---|---|
| DE | 10213521 A1 | 10/2003 |
| DE | 102016005990 A1 | 11/2017 |
| EP | 0715001 B1 | 3/1999 |
| EP | 2436456 A2 | 4/2012 |
| FR | 2513185 A1 | 3/1983 |
| JP | H07246801 A | 9/1995 |

OTHER PUBLICATIONS

European Search Report received for Application No. 22194672.6, completed Feb. 10, 2023.
Notification regarding third party observation received for Application No. 22194672.6, completed dated Oct. 16, 2024.

\* cited by examiner

WHEEL COMPONENT FOR A WHEEL OF A TWO-WHEELED VEHICLE OPERATED AT LEAST IN PART BY MUSCULAR ENERGY, AND A WHEEL, AND A METHOD

BACKGROUND

The present invention relates to a wheel component for a wheel of a two-wheeled vehicle operated at least in part by muscular energy, and a method of manufacturing a wheel component. The wheel component comprises at least one rim and at least one washer for placement between a spoke socket section and a spoke nipple.

Many different types of bicycle wheels have become known in the prior art. Hollow rims tend to be used with the spoke nipples disposed in the region of the hollow space between the rim base and the rim well. For reinforcing the rim base, rim eyelets may be employed, as is shown e.g. in EP 0 715 001 B1.

Alternately, or in addition to these rim eyelets, loose holding members are sometimes used for the spoke nipple in the rim base. For example, EP 1 897 701 B1 shows a holding member which is inserted in a through bore of the rim, enabling accommodation of the spoke nipple without play.

EP 2 769 851 B1 has disclosed a disk-shaped reinforcing unit with a convex, inner rim contact surface, and a concave, outer nipple contact surface. The adapted contact surfaces enable an optimal force transfer from the spoke nipple through the reinforcing unit to the rim base.

DE 10 2016 005 990 A1 shows a washer for spoke nipples made of a rotationally symmetrical, annular profile, which is adapted to the head radius placing surface of the spoke nipple. An underside covering surface of the washer effects transfer of the load from the spoke nipple to the rim base in the circumferential region of the spoke hole.

In view of this, it is the object of the present invention to provide an improved option for linking the spoke nipples with the rim. What is intended is, high stability and with it, reduced weight, and mounting in the least complicated way.

SUMMARY

The wheel component according to the invention is provided for, or constitutes, a wheel of a two-wheeled vehicle that is operated at least in part by muscular energy, and in particular a bicycle. The wheel component comprises at least one rim, provided to be connected with a hub by means of spokes. The rim comprises a rim base with a plurality of spoke socket sections, each having at least one spoke hole. The spokes can be attached to the spoke socket sections by means of spoke nipples. The wheel component comprises at least one washer for placement between a spoke socket section and a spoke nipple. The washer comprises a through hole extending between a top face and a bottom face. The wheel component comprises, in particular, a plurality of washers for placement between one spoke socket section and one spoke nipple each. The rim base comprises two opposite rim flanks extending obliquely relative to one another. The washer comprises on its bottom face, at least in sections, a canted support flank. The washer can be supported (for load transfer) on the rim flanks by means of its support flank such that only the support flank bears against, and contacts, the rim. The washer is, in particular, suitable and configured to be supported on the rim flanks solely by means of its support flank, for load transfer.

The wheel component according to the invention offers many advantages. The canted support flank offers a considerable advantage. It enables the spoke nipple to be specifically supported on the rim flanks of the rim. Thus, the forces introduced by the spoke nipple are transferred obliquely outwardly toward the rim, and they are thus kept clear of the region around the spoke hole. Thus, for example reinforcements in the rim base, or rim eyelets, can be dispensed with. On the whole, an improved load distribution results, such that the lightweight construction is aided further. At the same time, the wheel component is provided for uncomplicated and economic mounting.

The bottom face of the washer shows in particular at least one supporting section. The supporting section extends, in particular, between the through hole and the support flank. Thus, the supporting section is, in particular, disposed (in a mounting position as intended) floating above the rim base. The supporting section is, in particular, disposed spaced apart from the rim base. In particular, the supporting section does not contact the rim base.

The through hole and the support flank, in particular, open up the supporting section between one another. In particular, does the supporting section radially surround the through hole. The supporting section is, in particular, delimited radially inwardly by the through hole and radially outwardly, by the support flank. The supporting section is, in particular, disposed coaxially around the through hole. The support flank is, in particular, disposed coaxially around the supporting section. The supporting section extends, in particular, between the support flank and the through hole. The supporting section is, in particular, configured planar. Alternately, the supporting section may be non-planar and for example curved, and/or may show elevations and/or depressions.

The top face of the washer, in particular, also shows at least one supporting section. Preferably, the supporting section is at least partially configured as is the supporting section in the bottom face. Such a configuration is, in particular, provided where the top face is also provided with a support flank.

The support flank is, in particular, configured spherical. Preferably, the support flank is configured convexly curved. In the scope of the present invention, particulars regarding the curvature of the support flank, in particular, relate to a direction extending transverse to the principal plane of extension of the washer respectively the support flank (unless defined differently). The support flank in particular traces the outer contour of the washer in parallel to the principal plane of extension of the washer respectively the support flank. The principal plane of extension of the support flank is, in particular, parallel to the principal plane of extension of the washer.

The rim flanks are, in particular, configured at least approximately corresponding to the support flanks. The radii of the curvatures of the support flank and the rim flanks are, in particular, matched to one another and preferably identical. The rim flanks are, in particular, configured spherical and preferably concavely curved. This allows a particularly specific load transfer from the washer into the rim. The support flank may also be configured concavely curved. Then, each of the rim flanks is preferably in particular configured convexly curved.

The support flank may also be configured (transverse to the principal plane of extension) linear respectively without curvature. Then, the rim flanks are preferably likewise configured linear respectively without curvature. A conical support flank is, in particular, provided (in the case of a round washer). The (cone) angles of the support flank and the angles of the rim flanks are, in particular, matched to one another and preferably identical.

In all the configurations, it is preferred for the geometries of the support flank and the rim flanks to be matched to one another and, in particular, complementary so as to provide area contact. Alternately, it may be provided for the geometries of the support flank and the rim flanks to be complementary so as to provide line contact.

It is advantageous and preferred for the support flank to be configured as a closed circle. In other words, the support flank is configured continuous. The support flank extends, in particular, around the bottom face. For example, the support flank shows a circular outline. These particulars, in particular, relate to the principal plane of extension of the support flank.

The support flank may also show an open ring shape. In other words, the support flank is discontinuous. It is also possible for the support flank to comprise at least two support flank sections. Then, the support flank sections are, in particular, configured so that they can bear against one rim flank each. The support flank sections are in particular configured on opposite sides. The support flank sections are in particular configured where, in a mounting position as intended, the washer makes contact with the rim.

The support flank sections are, in particular, configured identical and for example configured in the same lengths and/or having the same flank angles and/or the same curvatures. The support flank sections are, in particular, symmetrically distributed over the circumference of the washer. Alternately, at least three or more support flank sections may be provided. Then, these are, in particular, symmetrically distributed over the circumference of the washer.

It is possible and advantageous for at least one circumferential cover section to be configured between the support flank and the top face of the washer, and preferably extending transverse to the bottom face and/or top face. The cover section is, in particular, configured cylindrical. Other geometries are likewise possible. A configuration without a cover section is also possible. For example, two support flanks abut one another, one support flank starting from the bottom face and one support flank starting from the top face.

In an advantageous specific embodiment, the cover section is configured with at least one positioning mark. Preferably, at least one lug or other type of elevation is provided. Additionally or alternatively, at least one depression may be provided. Additionally or alternatively, at least one positioning mark may be provided in the top face or bottom face. Such a positioning mark enables a simple while reliable detection of the orientation of the washer relative to the rim. For example, the positioning mark indicates the position of the support flank.

In a preferred and advantageous specific embodiment, the top face is also configured with at least one support flank. The support flank of the top face is preferably at least partially configured as it has been described above for the support flank of the bottom face. The support flank of the top face is preferably configured identical to the support flank of the bottom face. Alternatively, the support flank of the top face may be configured differently from the support flank of the bottom face. For example, the support flank of the top face may be provided for a different rim type. Then, simply turning over the washer selects the support flank matching the rim.

A nipple accommodation is, in particular, disposed on the top face of the washer to accommodate the supporting area of the spoke nipple. The geometry of the nipple accommodation is, in particular, matched to the geometry of the supporting area. The nipple accommodation and the supporting area are, in particular, configured corresponding to one another. The support flank is, in particular, disposed radially further outwardly from the nipple accommodation. The support flank in particular surrounds the nipple accommodation coaxially at least in sections. The nipple accommodation in particular surrounds the through hole coaxially at least in sections.

The supporting section is, in particular, configured axially beneath the nipple accommodation. The nipple accommodation and the support flank are, in particular, disposed so as to not overlap in the axial direction. The support flank is, in particular, disposed radially outwardly offset from the nipple accommodation.

The nipple accommodation is, in particular, configured as a closed circle. The nipple accommodation extends, in particular, parallel to the principal plane of extension of the washer. The nipple accommodation in particular traces the contour of the through hole. The nipple accommodation is, in particular, circular.

It is possible and advantageous for the nipple accommodation to be configured conical. It is also conceivable and advantageous for the nipple accommodation to be configured spherical and preferably concavely curved. The particulars relate, in particular, to a direction extending transverse to the principal plane of extension of the washer. The supporting area of the spoke nipple is, in particular, configured corresponding to the nipple accommodation. The supporting area is, in particular, configured spherical and preferably convexly curved. It is also possible for the nipple accommodation to be convexly curved and the supporting area of the spoke nipple, concavely curved.

In an advantageous specific embodiment, the nipple accommodation is configured showing an intended geometry divergence in relation to the supporting area of a spoke nipple provided for accommodation. This results, in particular, in that the supporting area of the spoke nipple is provided to be accommodated in the nipple accommodation in line contact. Alternatively, it may be provided for the nipple accommodation and the supporting area to combine to form an area contact.

The nipple accommodation in particular shows a curvature of a radius larger than the curvature of the supporting area of the spoke nipple. The wheel component may comprise at least one spoke nipple. It is also possible for the nipple accommodation to show a different cone angle than does the supporting area of the spoke nipple. Also possible is a combination of a conical nipple accommodation with a spherical supporting area, or a combination of a spherical nipple accommodation with a conical supporting area.

In all the configurations it is preferred and advantageous for the bottom face to also be configured with at least one nipple accommodation. Then, the nipple accommodation in the bottom face is preferably configured at least partially as it is described above for the nipple accommodation in the top face. The nipple accommodation in the bottom face is preferably configured identical with the nipple accommodation in the top face. The nipple accommodation in the bottom face may also be configured different from the nipple accommodation in the top face. For example, the nipple accommodation in the bottom face may be provided for a different spoke nipple type.

In a particularly advantageous specific embodiment, the support flank is configured at an angle relative to the principal plane of extension of the washer that is narrower than the nipple accommodation. The support flank extends, in particular, non-parallel and in particular non-orthogonal to the nipple accommodation. In the case of a support flank respectively a nipple accommodation showing a curvature, these particulars relate, in particular, to an imaginary line extending along the curvature. It is also possible and advantageous for the curvature (transverse to the principal plane of extension) of the support flank to show a radius larger than the curvature (transverse to the principal plane of extension) of the nipple accommodation. These particulars in particular relate to the support flank and the nipple accommodation which, in the mounted state as intended, bears against the rim respectively the spoke nipple.

It is possible and advantageous for the washer to be configured curved in the peripheral direction, at least in sections. This enables a good supporting surface in the case of elongated washers as well. It is possible for both the top face and the bottom face of the washer to each be configured curved in the peripheral direction of the rim. The bottom face and/or the top face are in particular configured at least partially concavely. Then, the support flank in the bottom face and/or the support flank in the top face are in particular curved in the peripheral direction of the rim. It is preferred for the top face and/or the bottom face to be configured substantially planar. The support flank in the bottom face and/or the support flank in the top face in particular trace this planar outline.

In a particularly preferred and advantageous configuration, the washer is configured symmetrical in respect of a mirror plane of symmetry that is parallel to the principal plane of extension of the washer, or that corresponds to the principal plane of extension.

Then, for example the top face and the bottom face are configured identical. Then, for example the support surface and the nipple accommodation in the bottom face are identical to those in the top face.

In a likewise preferred and advantageous specific embodiment, the washer is configured symmetrical in respect of a mirror plane of symmetry that is orthogonal to the principal plane of extension of the washer. The washer is, in particular, configured symmetrical in respect of the mirror plane of symmetry, which is parallel to, or coincides with, the longitudinal axis of the through hole. Then the washer is for example configured circular. Alternately, it is possible for the washer to be configured oval and, in particular, elliptical in shape. Alternately the washer may be configured polygonal and, in particular, rectangular (preferably with rounded corners). The washer may, in particular, be configured elongated.

In all the configurations it is particularly preferred for the washer to be configured (substantially) rotationally symmetrical. Such a configuration offers many advantages both when manufacturing the washer and when mounting the wheel. Then, the washer in particular shows an (at least approximately) cylindrical basic geometry. This basic geometry derives the actual geometry of the washer (for example by complementing the support surfaces and the through hole and the nipple accommodations). The washer may also show an elongated basic geometry. An example of this is, the washer is configured oval and in particular elliptical or also lenticular (also called shuttle or boat).

The wheel component may comprise at least one spoke nipple and/or at least one spoke and/or at least one hub.

Preferably, the washer shows an (in particular one-piece) basic body. The basic body is, in particular, provided with at least one coating at least in sections. The basic body is preferably coated across the entire surface. The coating (or at least one layer of the coating) comprises, in particular, at least one antifriction layer.

An antifriction layer may in particular consist of, or comprise, e.g. a dry antifriction varnish.

The washer according to the invention is provided for a wheel component as it is described above. The washer is, in particular, configured as described above for the washer of the wheel component.

The method according to the invention manufactures a wheel component for a (wheel of an) at least partially muscle-powered, two-wheeled vehicle. Provided is a raw material for manufacturing at least one washer. (At least) one blank is die-cut from the raw material. The blank is reshaped to form a basic body in at least one process step. At least one (layer of a) coating is applied on the basic body. The coating comprises at least one antifriction layer.

The method according to the invention is very advantageous and provides an advantageous wheel component. In particular, can advantageous washers be manufactured allowing a precise structure of a wheel. The antifriction layer improves precision of manufacturing since a more precisely defined spoke tension can be applied with better reproducibility. The frictional torque during mounting is reduced.

Preferably, at least one (water-based) sliding varnish is applied respectively at least one coating (respectively antifriction layer) comprises a (water-based) sliding varnish.

The coating material for the coating respectively the antifriction layer, in particular, comprises at least PTFE and/or at least one additive and in particular a UV additive.

Preferably, the liquid coating material (and, in particular, the sliding varnish) for applying the coating is provided in a dip tank. Preferably, a takeup carrier or container in the shape of e.g. a basket (such as a screen basket) carrying at least one basic body is immersed in the dip tank. The takeup carrier serves, in particular, to take up a plurality of basic bodies for simultaneous application of coating material.

It is advantageous for the takeup carrier (respectively the basket) to be brought out of contact with the liquid coating material (and, in particular, the sliding varnish) after immersion. This can be done by lifting the takeup carrier, by lowering the dip tank, by (temporarily) draining or sucking off the liquid coating material or the like. The takeup carrier is then rotated for centrifuging off excess coating material (the sliding varnish).

Preferably, the coating material (and, in particular, the sliding varnish) is cured by air-drying.

The coating process described may be repeated twice or multiple times. Different coating materials may be applied over the entire surface or on parts of the surface. In particular, at least one coating material is applied onto the contact surface respectively the conceivable contact surfaces of the washer with the spokes.

Particularly preferred, is at least one process step from a group of process steps comprising punching, embossing, bending, deep-drawing, barrel finishing, edge radiusing, deburring, and cleaning and degreasing operations. Further process steps or machining operations are likewise possible.

Preferably, raw material is provided in the shape of sheet metal and preferably in coils.

The blanks are, in particular, manufactured by progressive punching. Multiple process steps may be involved, such as punching and/or cutting operations, and other shaping processes. Preferably, the components are machined by barrel finishing to radius edges and deburr the blank. The basic body thus made is, in particular, cleaned and/or degreased.

The coating respectively application of at least one antifriction layer is done by first applying at least one dry antifriction varnish on the component by immersion centrifuging. To this end, in particular a water-based sliding varnish comprising at least one PTFE- and/or UV additive is provided in a dip tank.

A takeup carrier such as a screen basket is filled (at least partially) with components respectively the blanks or basic bodies provided for coating. The takeup carrier is immersed in the dip tank. The coating medium in the dip tank can be drained.

The takeup carrier configured, in particular, as a screen basket is rotated for centrifuging off excess material from the components. Curing the sliding varnish may, in particular, be done by air-drying. Finally, the screen basket is emptied. Multiple antifriction layers may be applied, and the coating process may be repeated (multiple times) as required.

Generally, the method according to this patent application may serve for manufacturing not only wheel components for a (wheel of an) at least partially muscle-powered, two-wheeled vehicle, but also for manufacturing other bicycle components. For example, rim eyelets or other bicycle components may be manufacturing accordingly. Raw material for manufacturing at least one component is provided. (At least) one blank is formed and, in particular, punched out of the raw material. The blank is reshaped to form a basic body in at least one process step. At least one (layer of a) coating is applied on the basic body. The coating comprises in particular at least one antifriction layer. The applicant reserves the right to claim such a method for other bicycle components as well. In specific embodiments, further steps may be employed in adapted ways, as described above.

The wheel according to the invention comprises, in particular, at least one wheel component as described above. The wheel comprises, in particular, a rim and a hub and a plurality of spoke nipples and spokes and washers. The wheel according to the invention also solves the object indicated above in a particularly advantageous way. The wheel is, in particular, provided for a two-wheeled vehicle and preferably a bicycle that is at least partially muscle-powered.

In the scope of the present invention the term "inclined" may, in particular, be used as a synonym of "angled". The rim flanks are, in particular, disposed angled to one another. The rim flanks extend, in particular, non-parallel and in particular non-orthogonal to one another. The rim flanks are, in particular, disposed inclined to an axial axis of the rim and in particular inclined to a radial plane of the rim. The rim flanks are, in particular, configured curved. Alternately it is possible for the rim flanks to be configured flat respectively planar.

The support flank may be referred to as a chamfer. The support flank is, in particular, configured in the way of a chamfer. The support flank, in particular, presents a canted material edge of the washer. The support flank extends, in particular, inclined to the longitudinal axis of the through hole. The support flank extends, in particular, inclined to the principal plane of extension of the washer. The support flank extends, in particular, non-parallel and in particular non-orthogonal to the principal plane of extension of the washer. The support flank is preferably adapted to the rim flanks. The incline of the support flank corresponds, in particular, with the inclines of the rim flanks.

The spoke socket sections each comprise at least one spoke hole for passing through at least one spoke and/or one spoke nipple each. The washer comprises, in particular, a through hole for passing through a spoke nipple and/or a spoke. The spoke holes are, in particular, disposed between the rim flanks. The spoke holes are, in particular, disposed where the two rim flanks begin or converge.

The washer is, in particular, provided with at least one support flank and preferably with at least two support flanks. At least one support flank is, in particular, configured in the bottom face. At least one support flank is, in particular, configured in the top face.

The washer is, in particular, provided with at least one nipple accommodation and preferably at least two nipple accommodations. At least one nipple accommodation is, in particular, provided in the bottom face. At least one nipple accommodation is in particular provided in the top face.

In a wheel mounted as intended, the support flank is disposed radially further outwardly from the supporting area of the spoke nipple. The load transfer from the washer into the rim, in particular, occurs radially further outwardly than does the load transfer from the spoke nipple into the washer. In particular, beneath the supporting area of the spoke nipple, there is no load transfer from the washer into the rim. The supporting section is in particular disposed beneath the supporting area of the spoke nipple. Preferably, the support flank and the supporting area of the spoke nipple are disposed not overlapping in the axial direction. In other words, the support flank is not disposed directly beneath the supporting area of the spoke nipple in the axial direction. The supporting section is, in particular, located directly beneath the supporting area of the spoke nipple in the axial direction.

The supporting section, in particular, extends between the nipple accommodation and the support flank. The support flank extends in particular angled to the supporting section. The supporting section extends, in particular, parallel to the principal plane of extension of the washer. The support section is in particular spaced apart from the through hole by the supporting section. The direction of force of the load transfer from the washer into the rim extends in particular inclined to the longitudinal axis of the through hole and in particular also inclined to the principal plane of extension of the rim.

Further advantages and features of the present invention can be taken from the description of the exemplary embodiments which will be discussed below with reference to the enclosed figures.

DETAILED DESCRIPTION

Figure 1:
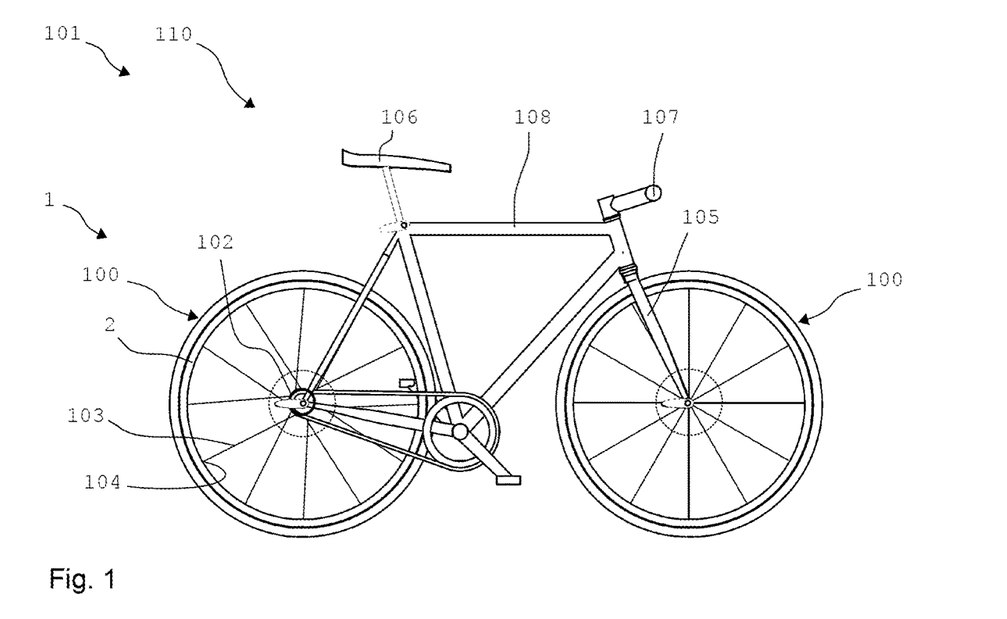
FIG. 1 a simplistic illustration of a bicycle with a wheel component according to the patent application.

FIG. 1 shows a schematic illustration of an at least partially muscle-powered two-wheeled vehicle 101, which is presently configured as a bicycle 110. The two-wheeled vehicle 101 comprises two wheels 100, a front wheel and a rear wheel, each provided with wheel components 1 according to the invention. Furthermore a frame 108, a fork 105, a handlebar 107, and a saddle 106 are provided. The drive provided is by pedals, and presently, a derailleur. The drive may e.g. also comprise an electric support. The front wheel and the rear wheel are each attached to dropouts at the fork 105 respectively the frame 108.

The wheels 100 each comprise a rim 2 and a hub 102, and spokes 103 and spoke nipples 104. The spokes 103 connect the rim 2 with the hub 102. The spokes 1 are shown schematically only, due to the image scale. Other than the rim 2, the wheel component 1 also comprises a washer 3 for each of the spoke nipples 104. The washers 3 are not shown, and they will be described in more detail with reference to the following Figures.

Figure 2:
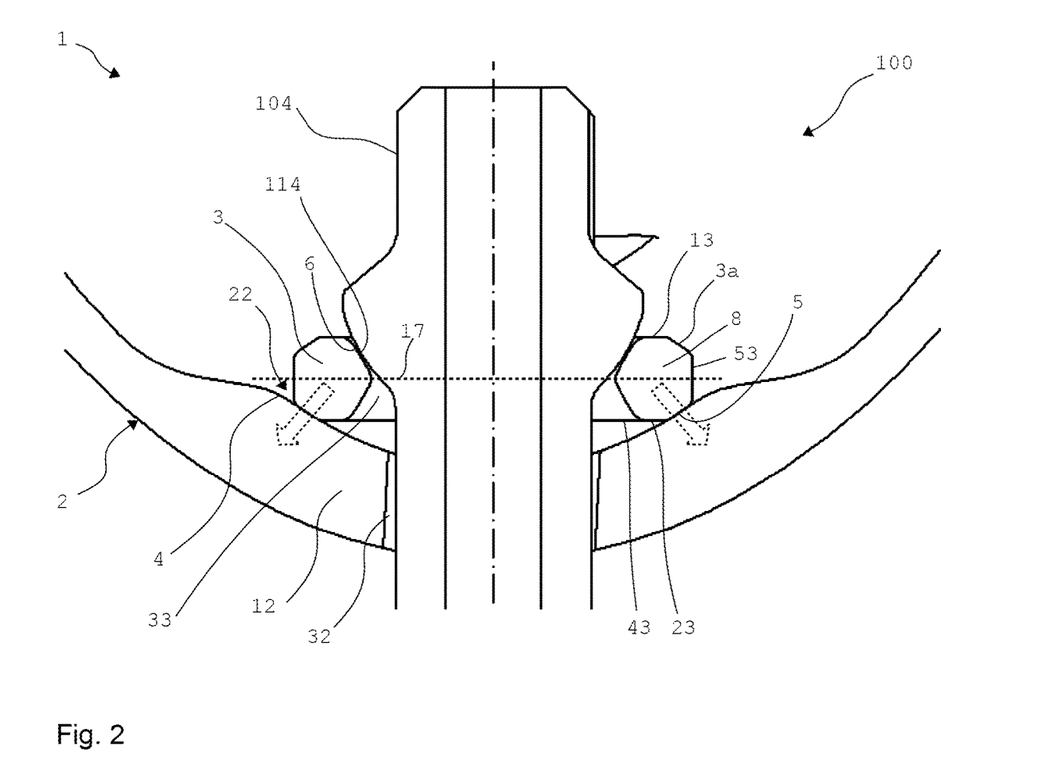
FIG. 2 a schematic detail illustration of a wheel component according to the patent application in a transverse sectional view.

FIG. 2 shows a detail illustration of a wheel 100 with a wheel component 1 according to the invention. The rim 2 comprises a rim base 12 with a plurality of spoke socket sections 22 having one spoke hole 32 each. The spoke nipple 104 and a spoke 103, not shown, extend through the spoke hole 32. The rim base 12 is provided with two rim flanks 4 positioned opposite one another and inclined to one another.

In the spoke socket sections 22 the wheel 100 is provided with washers 3. The washers 3 are disposed between the spoke socket sections 22 and the spoke nipples 104. In the top face 13 of the washer 3, a nipple accommodation 6 is configured. Correspondingly, the spoke nipple 104 shows a supporting area 114, so that the spoke nipple 104 is supported on the washer or one of the washers 3 for load transfer.

The washer 3 comprises a basic body 8. The basic body preferably consists of metal and may consist e.g. of steel. A coating 3a may be applied on the outer surface of the basic body 8. The coating 3a may be a sliding varnish, enhancing the sliding capabilities. This in particular enhances the rotation of the spoke nipple 104 on the supporting surface in the nipple accommodation 6 during mounting. This enhances mounting the wheel 100. The spoke tension can be set with better reproducibility.

The washer 3 is provided with a through hole 33 extending between the top face 13 and the bottom face 23. The longitudinal axis of the through hole 33 (dash-dotted line) extends orthogonal to the principal plane of extension 17 of the washer 3.

The washer 3 shown is provided with a nipple accommodation 6 in the bottom face 23 as well. Thus, when mounting it is not critical which of the sides 13, 23 is facing the spoke nipple 104.

In its bottom face 23, the washer 3 shows a canted support flank 5. The support flank 5 is configured corresponding to the rim flanks 4. Thus, the washer 3 is supported on the rim 2 for load transfer only by way of the support flank 5. To better illustrate load transfer, two arrows are shown in dotted lines. It can be clearly seen that the rim flanks 4 show a concave curvature. Correspondingly, the support flank 5 is configured with a convex curvature.

In this instance, the washer 3 contacts the rim 2 exclusively by its support flank 5. As can be clearly seen, the support flank 5 lies radially further outwardly than do the nipple accommodation 6 and the supporting area 114 of the spoke nipple 104. Thus, the force acting on the spoke nipple 104 is not simply dissipated downwardly but outwardly at an inclination. Thus, the forces are introduced into the rim 2 remote from the spoke hole 32. This is advantageous also because the rim base 12 tends to be weakened in the region of the spoke hole 32 due to the bore. The washer 3 shown offers on the whole a significant introduction of load into the rim 2. The washer 3 shown with its support flanks 5 transfers the forces to the rim 2 at an appropriate distance from the spoke hole 32.

In its bottom face 23 the washer 3 is provided with a supporting section 43 freely floating above the rim base 12. The supporting section 43 extends between the through hole 33 and the support flank 5. Thus, the bottom face 23 is configured largely contactless with the rim base 12. This offers advantages for example compared to types of washers transferring the forces directly into the rim base 12 through a bottom face with contact over large areas of, or even the entire surface.

The washer 3 shown is provided with a support flank 5 in its top face 13 as well. The support flank 5 in the top face is configured identical to the support flank 5 in the bottom face 23. Thus, it is not critical during mounting with which of the sides 13, 23 the washer is placed on the rim 2.

For example, the washer 3 shown is configured rotationally symmetrical. The basic geometry is cylindrical. Both the support flanks 5 and the nipple accommodations 6 are configured as closed circles and circular. A cylindrical cover section 53 is configured between the support flank 5 of the bottom face 23 and the support flank 5 of the top face 13.

Figure 3:
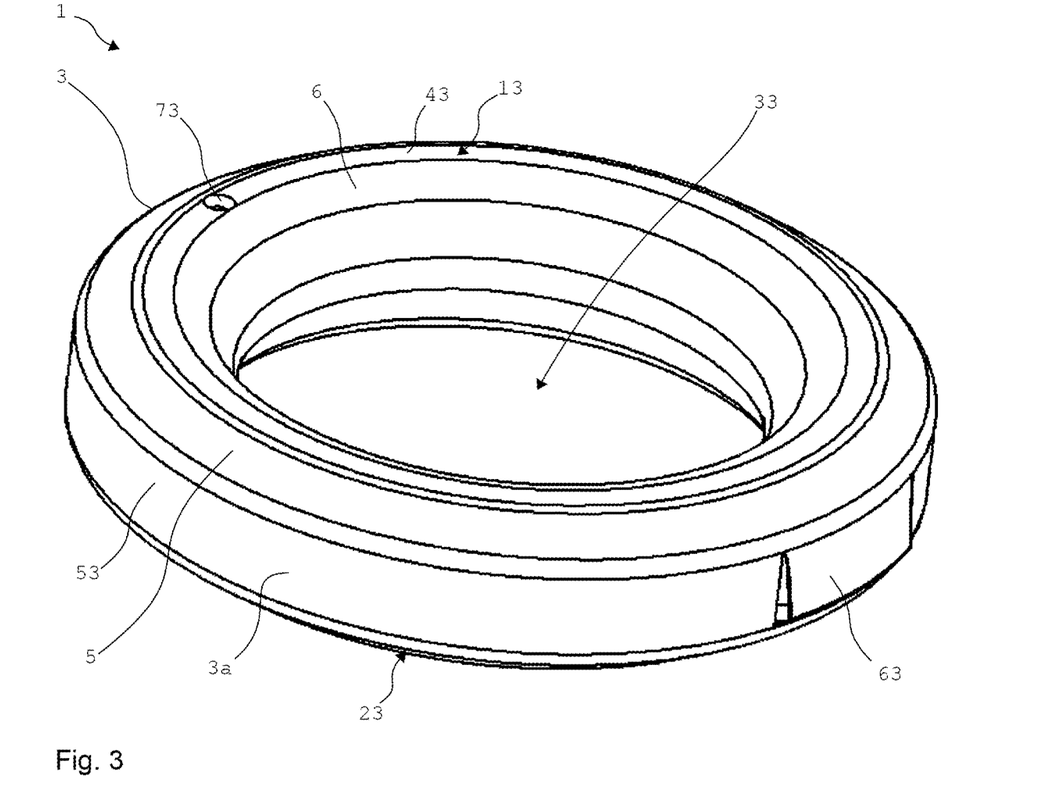
FIG. 3 a schematic illustration of a washer of a wheel component according to the patent application in a perspective view.

FIG. 3 shows a washer 3 as it is described for example with reference to the FIG. 2. In the configuration shown, the washer 3 is provided with a positioning mark 63. The positioning mark 63 is configured as a lug and is located on the cover section 53.

The nipple accommodation 6 or the entire surface of the washer 3 may comprise at least one coating in the shape of an antifriction layer 3a. This reduces the dynamic friction when mounting the wheel 100.

For ease and speed of detecting the orientation, the washer 3 is configured with a positioning mark 63 in its cover section 53. The positioning mark 63 is for example configured as a lug.

To better differentiate between the top face 13 and the bottom face 23, a positioning mark 73 is also disposed in the top face 13 of the supporting section 43. The positioning mark 73 is for example a roundish depression.

The positioning marks 63, 73 allow reliability of verifying the orientation. This is advantageous for example when the washer needs to be remounted in the same, or in an intentionally different orientation, following removal. Moreover, the positioning marks 63, 73 also allow to detect whether the washer 3 has rotated about its longitudinal axis, e.g. due to low tension of the spokes 103.

Figure 4:
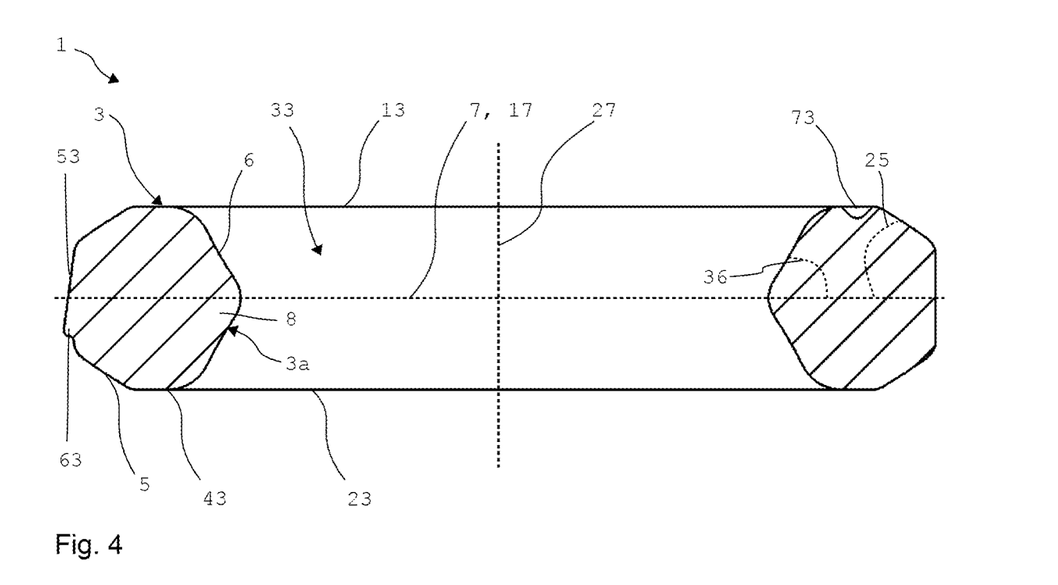
FIG. 4 the washer of the FIG. 3 in a side section view.

FIG. 4 shows a sectional side view of the washer 3 described above. It can be clearly seen that the washer 3 is configured symmetrical in respect of a mirror plane of symmetry 7 corresponding to the principal plane of extension 17. It can also be clearly seen that the washer is configured symmetrical in respect of a mirror plane of symmetry 27 extending orthogonal to the principal plane of extension 17.

The support flanks 5 are configured flatter than the nipple accommodations 6.

The support flanks 5 are canted at a defined angle 25 relative to the principal plane of extension 17. The nipple accommodations 6 are likewise canted at a defined angle 36 relative to the principal plane of extension 7. It can be clearly seen that the support flanks 5 extend at a flatter angle 25 than do the nipple accommodations.

Figure 5:
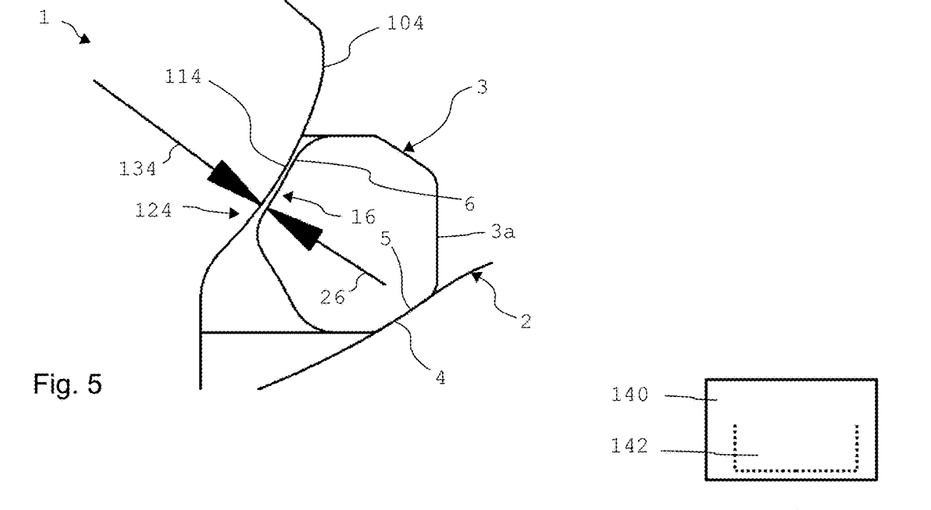
FIG. 5 another schematic detail illustration of a wheel component according to the patent application in a transverse sectional view.

FIG. 5 shows a configuration of the wheel component 1 described with reference to FIG. 2. The nipple accommodation 6 is configured showing a curvature 16 with a radius 26 larger than that of the curvature 124 with a radius 134 of the supporting area 114 of the spoke nipple 104. This results in a contact line of the spoke nipple 104 on the washer 3.

Figure 6:
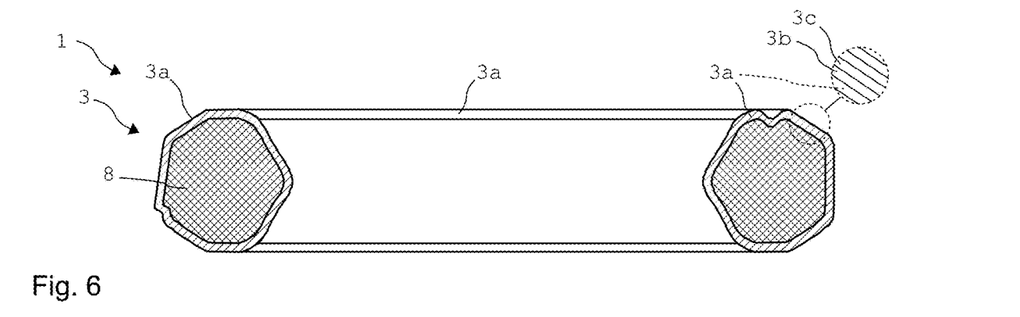
FIG. 6 a schematic cross-sectional view of a wheel component according to the patent application with a coating.

FIG. 6 shows a schematic cross section of the washer 3 according to FIG. 4, wherein the coating 3a applied on the basic body 8 can be recognized greatly enlarged. It is pointed out that in particular the thickness of the coating 3a is not shown to scale. Basically, the layer is thin enough so that its true scale would show as a very thin line. The coating 3a is applied fully over a major portion of the surface or on the entire surface of the washer 3. The coating 3a is in particular applied on the contact surface with the spoke nipples 104. If required, multiple layers 3a, 3b, 3c of the coating can be applied successively respectively on top of one another, as the enlarged schematic detail in the FIG. 6 shows on the right. The coating 3a, 3b, 3c is optionally applied using a dip tank 140. A basket 142 is preferably provided in the dip tank 140.

Figure 7:
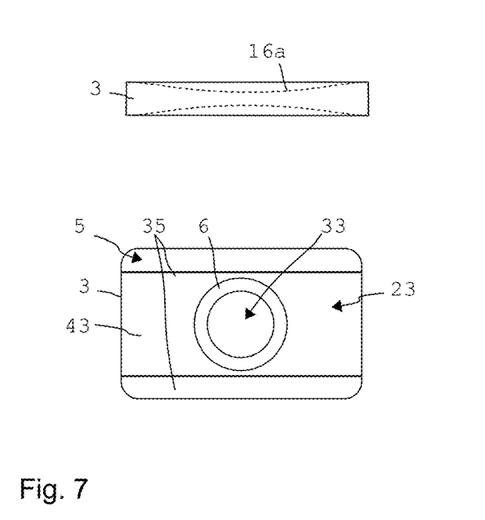
FIG. 7 a schematic illustration of a washer of a wheel component according to the patent application in a plan view.

FIG. 7 shows a washer 3 as described above e.g. with reference to the FIG. 2. This washer 3 shows a rectangular basic geometry. The support flank 5 is provided by two support flank sections 35. The support flank sections 35 extend on the longitudinal faces of the bottom face 23. The top face 13—not shown—is configured with two support flank sections 35, as is the bottom face 23. Alternately, an annular, closed support flank 5 may be provided.

The washer 3 is configured symmetrical in respect of a mirror plane of symmetry 7 corresponding to the principal plane of extension 17. The top face 13 is thus configured identical to the bottom face 23. Moreover, the washer 3 is configured symmetrical in respect of a mirror plane of symmetry 27 extending orthogonal to the principal plane of extension 17. It may be provided for the washer 3 to be configured curved in its longitudinal direction (respectively in the peripheral direction of the rim 2). For example, the top face 13 and the bottom face 23 are each curved concavely in their longitudinal directions.

Figure 8:
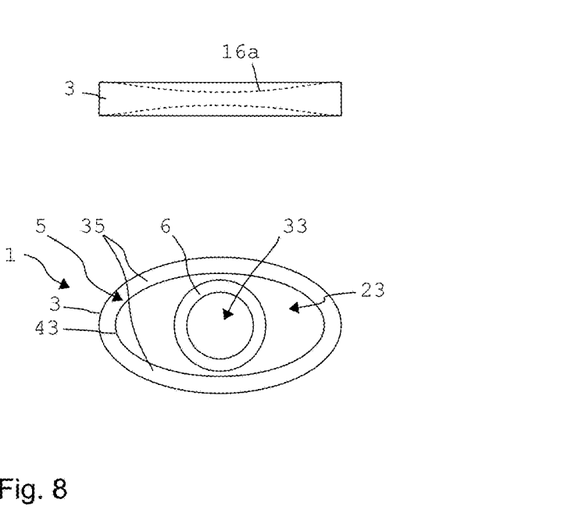
FIG. 8 a schematic illustration of another washer wheel component according to the patent application in a plan view.

FIG. 8 shows the washer 3 of the FIG. 7 with a different basic geometry. In the configuration shown, the washer 3 shows an elliptic basic geometry. The FIGS. 7 and 8 also illustrate on the top, a side view of the washers, showing variants in broken lines (not true to scale) where the washers are curved (curvature 16a) in the peripheral direction of the rim to then abut against the rim in the peripheral direction.

While a particular embodiment of the present wheel component for a wheel of a two-wheeled vehicle operated at least in part by muscular energy, and a wheel, and a method, have been described herein, it will be appreciated by those skilled in the art that changes and modifications may be made thereto without departing from the invention in its broader aspects and as set forth in the following claims.

LIST OF REFERENCE NUMERALS

| 1 | wheel component | 33 | through hole |
|---|---|---|---|
| 2 | rim | 35 | support flank section |
| 3 | washer | 36 | angle |
| 3a | coating | 43 | supporting section |
| 3b | coating | 53 | cover section |
| 3c | coating | 63 | positioning mark |

-continued

| 4 | rim flank | 73 | positioning mark |
|---|---|---|---|
| 5 | support flank | 100 | wheel |
| 6 | nipple accommodation | 101 | bicycle, two-wheeled vehicle |
| 7 | mirror plane of symmetry | | |
| 8 | basic body | 102 | hub |
| 12 | rim base | 103 | spoke |
| 13 | top face | 104 | spoke nipple |
| 16 | curvature | 105 | fork |
| 16a | curvature | 106 | saddle |
| 17 | principal plane of extension | 107 | handlebar |
| | | 108 | frame |
| 22 | spoke socket section | 110 | bicycle |
| 23 | bottom face | 114 | supporting area |
| 25 | angle | 124 | curvature |
| 26 | radius | 134 | radius |
| 27 | mirror plane | | |
| 32 | spoke hole | | |

The invention claimed is:

1. A wheel component for a wheel of an at least partially muscle-powered two-wheeled vehicle, comprising: at least one rim provided to be connected with a hub by means of spokes; the rim comprising a rim base with a plurality of spoke socket sections having one spoke hole each, to which the spokes can be attached by means of spoke nipples; and
comprising at least one washer for placement between a spoke socket section and a spoke nipple; wherein the washer comprises a through hole extending between a top face and a bottom face;
the rim base comprises two opposite rim flanks extending obliquely relative to one another; in its bottom face, the washer comprises a canted support flank at least in sections; and that the washer can be supported on the rim flanks by means of its support flank such that only the support flank bears against and contacts the rim;
a nipple accommodation to accommodate a supporting area of the spoke nipple is disposed in the top face of the washer; and
wherein the bottom face is also configured with at least one second nipple accommodation.

2. The wheel component according claim 1, wherein the bottom face of the washer comprises at least one supporting section extending between the through hole and the support flank, such that in an intended mounting position of the washer in the wheel, the supporting section is disposed floating above the rim base.

3. The wheel component according to claim 1, wherein the support flank is configured spherical and convexly curved.

4. The wheel component according to claim 1, wherein the support flank is configured as a closed circle.

5. The wheel component according to claim 1, wherein between the support flank and the top face of the washer, at least one circumferential cover section is configured, which extends transverse to the bottom face and/or top face.

6. The wheel component according to claim 5, wherein the cover section is configured with at least one positioning mark and at least one lug.

7. The wheel component according to claim 1, wherein the top face is also configured with at least one support flank.

8. The wheel component according to claim 1, wherein at least one of said nipple accommodations is configured as a closed circle.

9. The wheel component according to claim 1, wherein at least one of said nipple accommodations is configured conical or spherical and concavely curved.

10. The wheel component according to claim 1, wherein at least one of said nipple accommodations is configured showing an intended geometry divergence in relation to the supporting area of the spoke nipple provided for accommodation, such that the supporting area of the spoke nipple can be accommodated in the nipple accommodation showing a line contact.

11. The wheel component according to claim 10, wherein at least one of said nipple accommodations comprises a curvature showing a radius that is larger than a curvature of the supporting area of the spoke nipple.

12. The wheel component according to claim 1, wherein the support flank is configured at an angle relative to a principal plane of extension of the washer that is narrower than the nipple accommodations.

13. The wheel component according to claim 1, wherein the washer is configured curved in the peripheral direction of the rim at least in sections.

14. The wheel component according to claim 1, wherein the washer is configured elongated.

15. The wheel component according to claim 1, wherein the washer is configured symmetrical in respect of a mirror plane of symmetry which is parallel to a principal plane of extension of the washer, or which corresponds to the principal plane of extension.

16. The wheel component according to claim 1, wherein the washer is configured symmetrical in respect of a mirror plane of symmetry, which is orthogonal to a principal plane of extension of the washer.

17. The wheel component according to claim 1, wherein the washer is configured rotationally symmetrical.

18. The wheel component according to claim 1, wherein the washer comprises a basic body and at least one coating applied thereon in sections.

19. The wheel component according to claim 18, wherein the coating comprises at least one antifriction layer made of a dry antifriction varnish.

20. The washer for the wheel component according to claim 1.

21. A method of manufacturing a wheel component for an at least partially muscle-powered two-wheeled vehicle, wherein a raw material for manufacturing at least one washer is provided, and a blank is die-cut from the raw material, and wherein the blank is reshaped in at least one process step to form a basic body,
wherein at least one coating with at least one antifriction layer is applied on the basic body, and
wherein the liquid coating material is provided in a dip tank.

22. The method according to claim 21, wherein the at least one coating comprises a sliding varnish.

23. The method according to claim 21, wherein the at least one coating comprises PTFE and/or a UV additive.

24. The method according to claim 21, wherein a basket carrying at least one basic body is immersed in the dip tank.

25. The method according to claim 24, wherein the basket is brought out of contact with the liquid coating material and rotated for centrifuging off excess coating material.

26. The method according to claim 22, wherein the sliding varnish is cured by air-drying.

27. The method according to claim 21, wherein the coating is applied twice or multiple times.

28. The method according to claim 21, wherein at least one process step is taken from a group of process steps comprising punching, embossing, bending, deep-drawing, barrel finishing, edge radiusing, deburring, and cleaning and degreasing operations.

29. A wheel including the at least one wheel component according to claim 1.

30. A wheel component for a wheel of an at least partially muscle-powered two-wheeled vehicle, comprising: at least one rim provided to be connected with a hub by means of spokes; the rim comprising a rim base with a plurality of spoke socket sections having one spoke hole each, to which the spokes can be attached by means of spoke nipples; and comprising at least one washer for placement between a spoke socket section and a spoke nipple; wherein the washer comprises a through hole extending between a top face and a bottom face;
the rim base comprises two opposite rim flanks extending obliquely relative to one another; in its bottom face, the washer comprises a canted support flank at least in sections; and that the washer can be supported on the rim flanks by means of its support flank such that only the support flank bears against and contacts the rim;
further including a nipple accommodation to accommodate a supporting area of the spoke nipple is disposed in the top face of the washer;
the nipple accommodation is configured showing an intended geometry divergence in relation to the supporting area of the spoke nipple provided for accommodation, such that the supporting area of the spoke nipple can be accommodated in the nipple accommodation showing a line contact; and
wherein the nipple accommodation comprises a curvature showing a radius that is larger than a curvature of the supporting area of the spoke nipple.

31. A wheel component for a wheel of an at least partially muscle-powered two-wheeled vehicle, comprising: at least one rim provided to be connected with a hub by means of spokes; the rim comprising a rim base with a plurality of spoke socket sections having one spoke hole each, to which the spokes can be attached by means of spoke nipples; and comprising at least one washer for placement between a spoke socket section and a spoke nipple; wherein the washer comprises a through hole extending between a top face and a bottom face;
the rim base comprises two opposite rim flanks extending obliquely relative to one another; in its bottom face, the washer comprises a canted support flank at least in sections; and that the washer can be supported on the rim flanks by means of its support flank such that only the support flank bears against and contacts the rim;
further including a nipple accommodation to accommodate a supporting area of the spoke nipple is disposed in the top face of the washer; and
wherein the support flank is configured at an angle relative to a principal plane of extension of the washer that is narrower than the nipple accommodation.

\* \* \* \* \*